United States Patent

Choi et al.

[11] Patent Number: 5,874,802
[45] Date of Patent: Feb. 23, 1999

[54] CATHODE BODY, ELECTRON GUN, AND CATHODE RAY TUBE EMPLOYING A FERROELECTRIC EMITTER

[75] Inventors: Jong-seo Choi, Anyang; Kwi-seuk Choi; Kyu-nam Joo, both of Suwon, all of Rep. of Korea

[73] Assignee: Samsung Display Devices Co., Ltd., Kyungki-Do, Rep. of Korea

[21] Appl. No.: 777,312

[22] Filed: Dec. 27, 1996

[30] Foreign Application Priority Data

Dec. 29, 1995 [KR] Rep. of Korea ............... 1995 66821

[51] Int. Cl.⁶ ......................................... H01J 1/62
[52] U.S. Cl. ........................... 313/495; 313/446; 313/310
[58] Field of Search ................... 313/414, 417, 313/446, 495, 506, 310, 311

[56] References Cited

U.S. PATENT DOCUMENTS

| | | | |
|---|---|---|---|
| 5,453,661 | 9/1995 | Auciello et al. | 313/497 |
| 5,508,590 | 4/1996 | Sampayan et al. | 313/346 R |

FOREIGN PATENT DOCUMENTS

| | | |
|---|---|---|
| 0 428 853 A2 | 5/1991 | European Pat. Off. . |
| 2639151 | 5/1990 | France . |
| 5325777 | 12/1993 | Japan . |
| 8203418 | 8/1996 | Japan . |

OTHER PUBLICATIONS

Gundel et al., "Intense charged-particle emission in a diffuse vacuum discharge", Applied Physics Letters, vol. 56, No. 16, pp. 1532–1534, Apr. 16, 1990.

Auciello, M.A., O., et al. "Low voltage electron emission from Pb ($Zr_xTi_{1-x}$) $O_3$ –based thin film cathodes." *Applied Physics Letters* vol. 66, No. 17, 24 Apr. 1995: 2183–2185.

*Primary Examiner*—Vip Patel
*Attorney, Agent, or Firm*—Leydig, Voit & Mayer

[57] ABSTRACT

A cathode, an electron gun, and a cathode ray tube include a ferroelectric electron source. The cathode includes a substrate; a lower electrode layer on the substrate; a cathode layer, on the lower electrode layer, the cathode layer including a ferroelectric emitter; an upper electrode layer, on the ferroelectric cathode layer, the upper electrode layer having electron emitting regions comprising a plurality of electron emission holes for passing electrons emitted from the ferroelectric emitter; and a driving electrode layer, supported by the upper electrode layer, for controlling passage of electrons through the electron emitting regions in the upper electrode layer and the driving electrode layer.

36 Claims, 5 Drawing Sheets

CATHODE BODY, ELECTRON GUN, AND CATHODE RAY TUBE EMPLOYING A FERROELECTRIC EMITTER

BACKGROUND OF THE INVENTION

The present invention relates to a cathode body employing a ferroelectric emitter, and an electron gun and cathode ray tube using the ferroelectric cathode, and more particularly, to a cathode body employing a ferroelectric emitter as an electron emitting source, and an electron gun and cathode ray tube using the ferroelectric cathode.

Generally, a cathode body used in a cathode ray tube emits electrons from the cathode body formed of material such as thermally excited barium oxide. Such a cathode body has a heat source for heating the cathode body, e.g., a filament. Such cathodes may be divided into directly-heated cathodes and indirectly-heated cathodes according to the type of filament used to heat the cathode body.

Moreover, the inside of a cathode ray tube should be kept in a high-vacuum state so that the electrons emitted from the electron gun can fly toward a screen without any obstruction, and deterioration of the cathode body due to sputtering by ions can be prevented.

A cathode ray tube manufacturing process generally includes a series of optimization steps such as evacuation and aging steps so that the electrons can be successfully emitted from the cathode body material. However, such a process takes a lot of time and causes deterioration of the cathode body material due to impact by ionized foreign materials.

SUMMARY OF THE INVENTION

An object of the present invention is to provide a cathode body employing a ferroelectric emitter capable of decreasing deterioration of the cathode material due to ion impact under even a low vacuum state.

Another object of the present invention is to provide an electron gun and a cathode ray tube which use the cathode body employing the ferroelectric emitter.

To achieve the first object, there is provided a cathode body including;

a substrate;

a lower electrode layer formed on the substrate;

a cathode layer, formed on the lower electrode layer, employing a ferroelectric emitter;

an upper electrode layer, formed on the ferroelectric cathode layer, having regions capable of emitting electrons from the surface thereof; and a driving electrode layer, formed on the upper electrode layer, for controlling the emission of electrons from the electron emitting regions of the upper electrode layer.

To achieve the second object, there is provided an electron gun including:

the above-described cathode body;

an electrode group including a plurality of electrodes for controlling and accelerating electrons emitted from the cathode body; and supporting means for supporting the cathode body and the electrode group.

To achieve the third object, there is provided a cathode ray tube including:

the above-described electron gun;

a funnel having a neck portion in which the electron gun is installed; and a panel having a screen on which pictures are displayed by an electron beam emitted from the electron gun.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
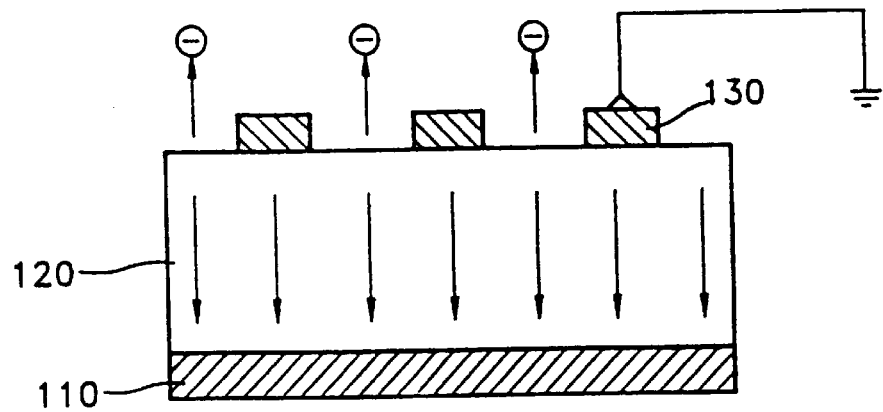
FIG. 1 is a cross-sectional diagram showing an embodiment of a cathode body according to the present invention.

Referring to FIG. 1, numeral 120 denotes a ferroelectric cathode layer which is an electron emitter, and numerals 110 and 130 are lower and upper electrode layers, respectively, for exciting the ferroelectric cathode layer.

When a high voltage pulse is applied to the upper and lower electrodes 110, and 130 for less than a microsecond, spontaneous polarization occurs on the surface and inside of the ferroelectric cathode layer 120 and thus electrons are emitted.

Figure 2:
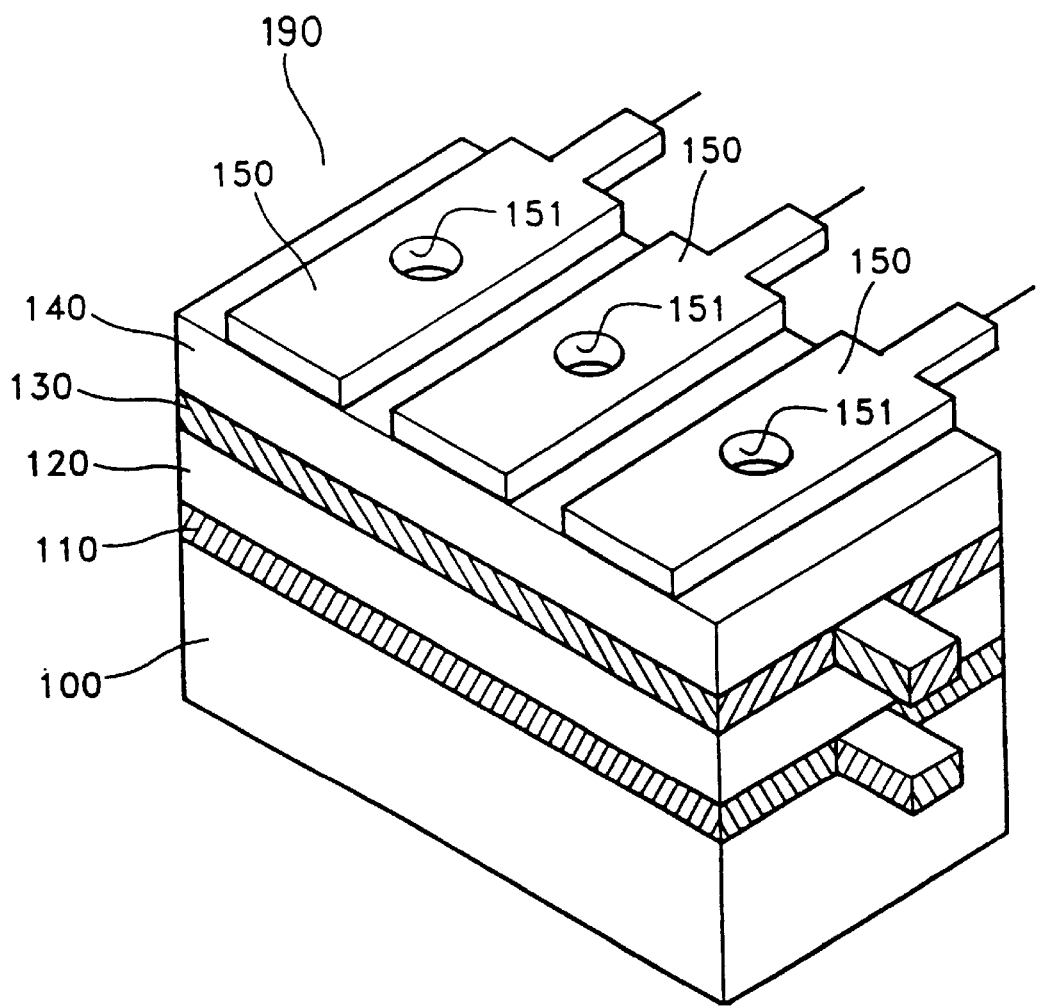
FIG. 2 is a schematic perspective diagram showing a cathode according to an embodiment of the present invention.
Figure 3:
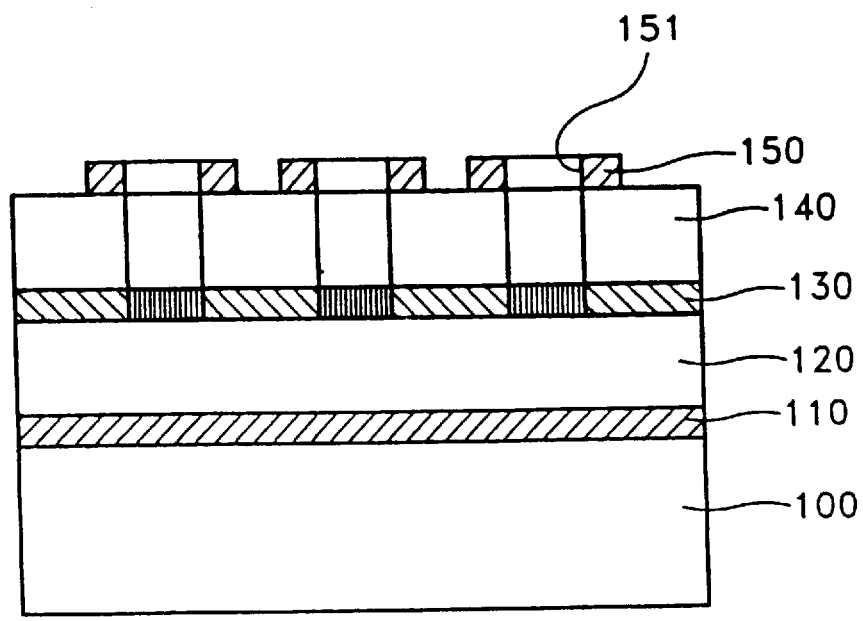
FIG. 3 is a cross-sectional diagram of the cathode body shown in FIG. 2.

Referring to FIG. 2 which shows a cathode body 190 according to an embodiment of the present invention, the lower electrode 110 is formed on a substrate 100 and then, the cathode layer 120 employing the ferroelectric emitter, the upper electrode layer 130, an insulating layer 140, and a drive electrode layer 150 are sequentially formed thereon. The cathode body 190 shown in FIG. 2 has three electron emission holes 151 for use in a color cathode ray tube.

Figure 4:
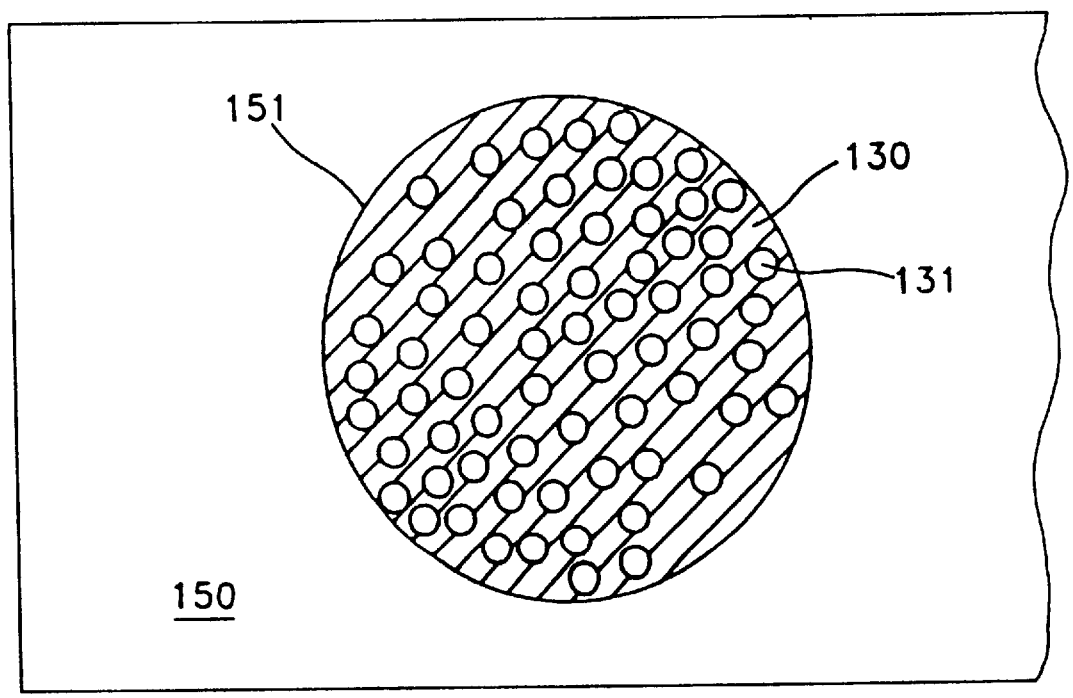
FIG. 4 is a diagram showing a magnified portion of the upper electrode of the cathode body shown in FIG. 2.

In more detail, there is one upper electrode layer 130 and one lower electrode layer 110 for exciting the ferroelectric cathode layer 120. On the insulating layer 140, drive electrode layer 150 constituted by three drive electrodes disposed at regular intervals is formed. Each drive electrode 150 has an electron emission hole 151 for electron emission and control. Moreover, on a portion of the upper electrode layer 130 corresponding to the electron emission holes 151, a great number of fine holes 131, as shown in FIG. 4 are formed so that electrons can move toward the electron emission holes 151 of the drive electrode layer 150. The drive electrode layer 150 receives control signals such as an image signal, and controls electron emission and emission quantity.

In the cathode body according to an embodiment of the present invention, PZT and PLZT which are well known as a ferroelectric materials can be adapted. Moreover, a highly conductive metal such as Al, Au, or Ag can be used for the upper and lower electrodes 130, and 110.

According to an experiment, a driving voltage for emitting electrons from the ferroelectric cathode layer 120 should be below 100 volts so as to reduce current leakage and secure a stable electron emission. The driving voltage depends on the state of the ferroelectric material, i.e. crystal phase and thickness thereof. In addition, according to an experiment, it is desirable that the thickness of the ferroelectric cathode layer 120 (e.g. PLZT), should be below 10 micrometers so as to keep the driving pulse voltage below 100 volts. The driving voltage decreases as the thickness of the cathode layer decreases, whereas a short between electrodes may occur at a thickness of less than one micrometer and thus the thickness of the cathode layer must be over one micrometer. Moreover, the magnitude of the driving voltage largely depends on the size of the electron emission region, i.e. the electron emission hole size on the drive electrode 150. According to an experiment, the electron emission hole size should be below 300 micrometers for a stable electron emission under 100 volts.

A manufacturing method for such a cathode body according to an embodiment of the present invention will be described below.

Figure 5:
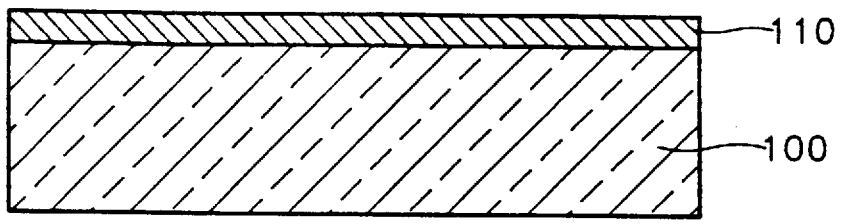
FIGS. 5 through 8 show the manufacturing processes for the cathode body shown in FIG. 2.

As shown in FIG. 5, first, gold paste is formed on the substrate 100, constituted by crystallized glass, using a printing method, and then plasticized for a predetermined time to form the lower electrode layer 110.

Figure 6:
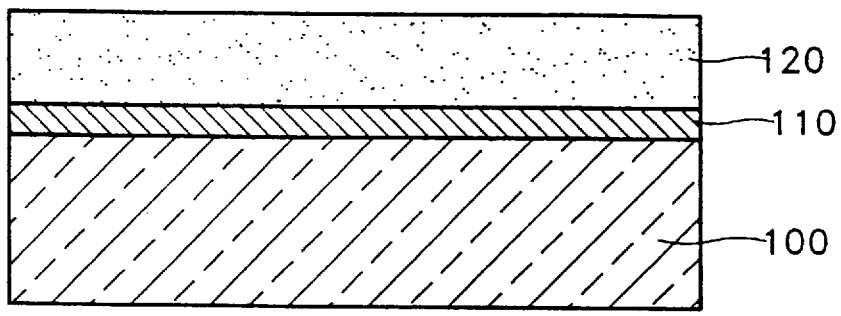

When the lower electrode layer 110 is completed, as shown in FIG. 5, paste of PZT or PLZT is applied to a thickness of 20 micrometers using a printing method, and then plasticized to form the ferroelectric cathode layer 120 as shown in FIG. 6.

Figure 7:
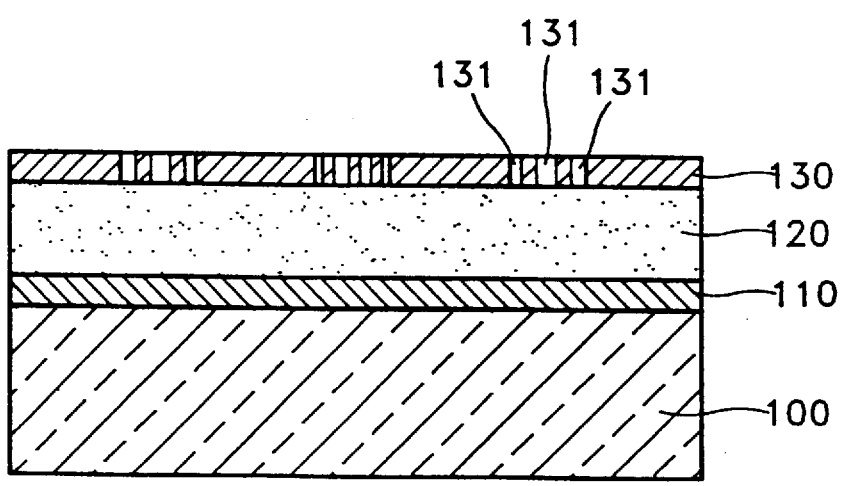

As shown in FIG. 7, gold paste is deposited on the ferroelectric cathode layer 120 using a printing method, and then plasticized to form the upper electrode layer 130. At this time, the upper electrode 130 is formed in the same pattern as shown in FIG. 4, i.e. having a plurality of fine emission holes 131.

Figure 8:
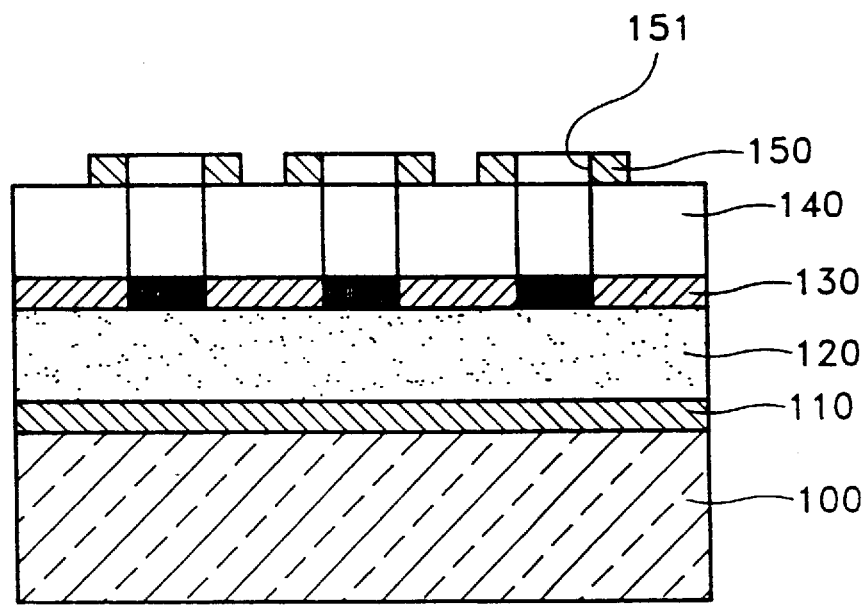

As shown in FIG. 8, the insulating layer 140 and the driving electrode layer 150 are also sequentially formed thereon using a printing method. As a result, the desired cathode body is obtained. In addition, the insulating layer 140 and driving electrode layer 150 should have holes therein corresponding to the fine emission holes 131 of the upper electrode 130.

The cathode body according to another embodiment of the present invention, using a method other than the printing method, can be employed. For example, for the electrode layer formation, sputtering, or a doctor blade can be employed, and for forming the ferroelectric cathode layer, a method of manufacturing a ferroelectric sheet in a bulk state, applying an electrode layer coating on one side thereof, molding this with acrylic resin, polishing the other side to a predetermined thickness, and affixing it to the substrate 100, can be employed.

Figure 9:
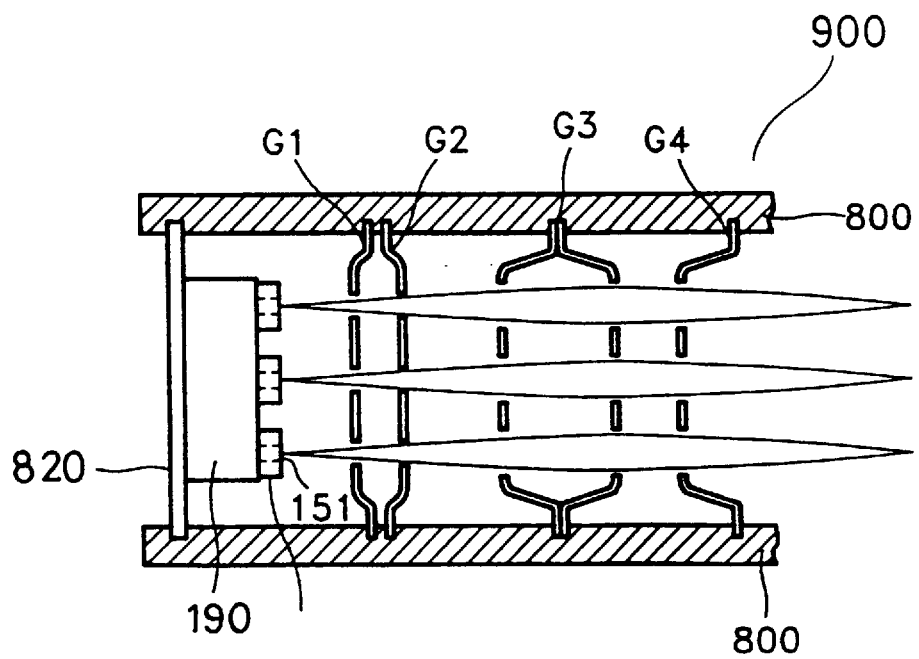
FIG. 9 is a schematic cross-sectional diagram showing an electron gun employing a cathode body according to an embodiment of the present invention.

FIG. 9 shows an electron gun 900 employing a cathode body according to an embodiment of the present invention.

The electron gun 900 has a main lens constituted by the cathode body 190 described above, a control electrode G1, a screen electrode G2, a focus electrode G3 and an accelerating electrode G4. The elements are supported by a glass insulator 800. The reference numeral 820 denotes a variable fixing pin for fixing the cathode body 190 to the glass insulator 800.

Figure 10:
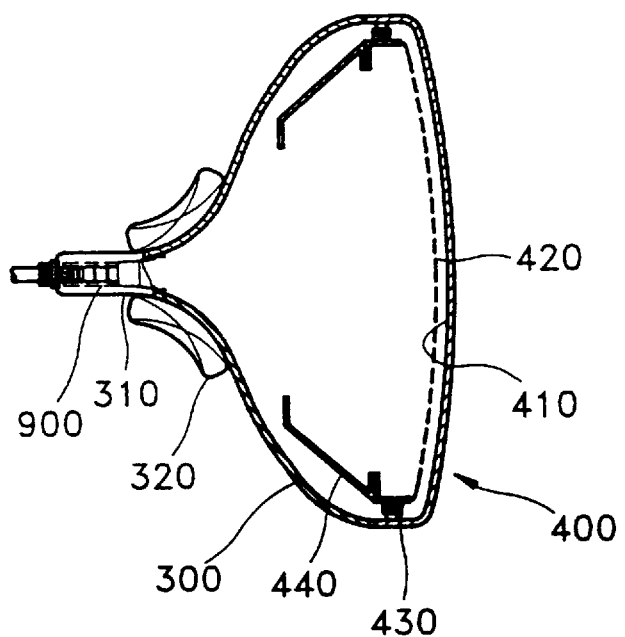
FIG. 10 is a schematic cross-sectional diagram showing a cathode ray tube employing an electron gun according to an embodiment of the present invention.

FIG. 10 shows a cathode ray tube employing an electron gun according to an embodiment of the present invention.

Referring to FIG. 10, a funnel 300, having a deflection yoke 320 on the outer surface thereof, including an electron gun 900 and a panel 400, having a screen 410 on the inside wall thereof, are combined to form a vacuum container. A shadow mask 420 and an inner shield 440 which are supported by a frame 430 fixed to the panel 400 are located inside the cathode ray tube.

When assembly of such a cathode ray tube is complete, evacuation and aging processes are performed, which takes about four hours in the case of a conventional cathode ray tube, but only two hours in the case of a cathode ray tube employing a cathode body according to an embodiment of the present invention. In addition, compared with a conventional cathode ray tube, the cathode ray tube employing a cathode body according to an embodiment of the present invention is not damaged by decreasing the degree of vacuum by one order of magnitude.

As described above, by employing a ferroelectric cathode body, evacuation and aging processes which have been pointed out as a problem in a conventional cathode ray tube manufacturing process can be technically simplified and thus the cost of production can be reduced. Furthermore, because the novel cathode ray tube doesn't employ a thermal source such as a filament, the cost of parts can also be reduced and thermal modification of the cathode body and elements neighboring the thermal source can be prevented. In addition, electron emission occurs upon the application of a transient pulse thereto and thus emission of electrons can be performed rapidly.

What is claimed is:

1. A cathode body comprising:

a substrate;

a lower electrode layer on said substrate;

a cathode layer, on said lower electrode layer, said cathode layer including a ferroelectric emitter;

an upper electrode layer, on said ferroelectric cathode layer, said upper electrode layer having electron emitting regions comprising a plurality of electron emission holes for passing electrons emitted from the ferroelectric emitter; and a driving electrode layer, supported by said upper electrode layer, for controlling passage of electrons through the electron emitting regions in said upper electrode layer and said driving electrode layer.

2. The cathode body as claimed in claim 1, wherein said driving electrode layer comprises three driving electrodes, each driving electrode having an electron emission hole for passing electrons, and the electron emitting regions in said upper electrode layer correspond to the electron emission holes in said driving electrode layer.

3. The cathode body as claimed in claim 2, wherein the electron emission holes in said driving electrode layer have a diameter less than 300 micrometers.

4. The cathode body as claimed in claim 3, wherein said ferroelectric cathode layer include a material selected from the group consisting of PZT and PLZT.

5. The cathode body as claimed in claim 4, wherein said ferroelectric cathode layer have a thickness between 1 and 100 micrometers.

6. The cathode body as claimed in claim 2, wherein said ferroelectric cathode layer have a thickness between 1 and 100 micrometers.

7. The cathode body as claimed in claim 2, wherein said ferroelectric cathode layer includes a material selected from the group consisting of PZT and PLZT.

8. The cathode body as claimed in claim 7, wherein said ferroelectric cathode layer have a thickness between 1 and 100 micrometers.

9. The cathode body as claimed in claim 3, wherein said ferroelectric cathode layer have a thickness between 1 and 100 micrometers.

10. The cathode body as claimed in claim 1, wherein said ferroelectric cathode layer include a material selected from the group consisting of PZT and PLZT.

11. The cathode body as claimed in claim 10, wherein said ferroelectric cathode layer have a thickness between 1 and 100 micrometers.

12. The cathode body as claimed in claim 1, wherein said ferroelectric cathode layer have a thickness between 1 and 100 micrometers.

13. An electron gun comprising:
a cathode including:
    a substrate;
    a lower electrode layer on said substrate;
    a cathode layer, on said lower electrode layer, said cathode layer including a ferroelectric emitter;
    an upper electrode layer, on said ferroelectric cathode layer, said upper electrode layer having electron emitting regions comprising a plurality of electron emission holes for passing electrons emitted from the ferroelectric emitter; and
    a driving electrode layer, supported by said upper electrode layer, for controlling passage of electrons through the electron emitting regions in said upper electrode layer and said driving electrode layer;
an electrode group including a plurality of electrodes for controlling and accelerating electrons emitted from said cathode; and
supporting means for supporting said cathode and said electrode group.

14. The electron gun as claimed in claim 13, wherein said driving electrode layer comprises three driving electrodes, each driving electrode having an electron emission hole for passing electrons, and the regions in said upper electrode layer correspond to the electron emission holes in said driving electrode layer.

15. The electron gun as claimed in claim 14, wherein the electron emission holes in said driving electrode layer have a diameter less than 300 micrometers.

16. The electron gun as claimed in claim 15, wherein said ferroelectric cathode layer includes a material selected from the group consisting of PZT and PLZT.

17. The electron gun as claimed in claim 16, wherein said ferroelectric cathode layer has a thickness between 1 and 100 micrometers.

18. The electron gun as claimed in claim 14, wherein said ferroelectric cathode layer has a thickness between 1 and 100 micrometers.

19. The electron gun as claimed in claim 14, wherein said ferroelectric cathode layer includes a material selected from the group consisting of PZT and PLZT.

20. The electron gun as claimed in claim 19, wherein said ferroelectric cathode layer has a thickness between 1 and 100 micrometers.

21. The electron gun as claimed in claim 15, wherein said ferroelectric cathode layer has a thickness between 1 and 100 micrometers.

22. The electron gun as claimed in claim 13, wherein said ferroelectric cathode layer includes a material selected from the group consisting of PZT and PLZT.

23. The electron gun as claimed in claim 22, wherein said ferroelectric cathode layer has a thickness between 1 and 100 micrometers.

24. The electron gun as claimed in claim 13, wherein said ferroelectric cathode layer has a thickness between 1 and 100 micrometers.

25. The cathode ray tube comprising:
an electron gun including:
    a cathode comprising:
        a substrate;
        a lower electrode layer on said substrate;
        a cathode layer, on said lower electrode layer, said cathode layer including a ferroelectric emitter;
        an upper electrode layer, on said ferroelectric cathode layer, said upper electrode layer having electron emitting regions comprising a plurality of electron emission holes for passing electrons emitted from the ferroelectric emitter; and
        a driving electrode layer, supported by said upper electrode layer, for controlling passage of electrons through the electron emitting regions in said upper electrode layer and said driving electrode layer;
    an electrode group including a plurality of electrodes for controlling and accelerating electrons emitted from said cathode layer; and
    supporting means for supporting said cathode and said electrode group;
a funnel having a neck in which said electron gun is located; and
a panel having a screen on which pictures are displayed in response to an electron beam emitted from said electron gun and incident on said screen.

26. The cathode ray tube as claimed in claim 25, wherein said driving electrode layer comprises three driving electrodes, each driving electrode having an electron emission hole for passing electrons, and the regions in said upper electrode layer correspond to the electron emission holes in said driving electrode layer.

27. The cathode ray tube as claimed in claim 26, wherein the electron emission holes in said driving electrode layer have a diameter less than 300 micrometers.

28. The cathode ray tube as claimed in claim 26, wherein said ferroelectric cathode layer includes a material selected from the group consisting of PZT and PLZT.

29. The cathode ray tube as claimed in claim 28, wherein said ferroelectric cathode layer has a thickness between 1 and 100 micrometers.

30. The cathode ray tube as claimed in claim 26, wherein said ferroelectric cathode layer has a thickness between 1 and 100 micrometers.

31. The cathode ray tube as claimed in claim 27, wherein said ferroelectric cathode layer includes a material selected from the group consisting of PZT and PLZT.

32. The cathode ray tube as claimed in claim 31, wherein said ferroelectric cathode layer has a thickness between 1 and 100 micrometers.

33. The cathode ray tube as claimed in claim 27, wherein said ferroelectric cathode layer has a thickness between 1 and 100 micrometers.

34. The cathode ray tube as claimed in claim 25, wherein said ferroelectric cathode layer includes a material selected from the group consisting of PZT and PLZT.

35. The cathode ray tube as claimed in claim 34, wherein said ferroelectric cathode layer has a thickness between 1 and 100 micrometers.

36. The cathode ray tube as claimed in claim 25, wherein said ferroelectric cathode layer has a thickness between 1 and 100 micrometers.

* * * * *

UNITED STATES PATENT AND TRADEMARK OFFICE
CERTIFICATE OF CORRECTION

PATENT NO. : 5,874,802
DATED : February 23, 1999
INVENTOR(S) : CHOI et al.

It is certified that error appears in the above-identified patent and that said Letters Patent is hereby corrected as shown below:

Column 4, line 54, change "include" to --includes--.

Column 5, line 5, change "include" to --includes--.

Column 6, line 4, change "The" to --A--.

Signed and Sealed this

Twenty-fourth Day of August, 1999

Q. TODD DICKINSON

*Attest:*

*Attesting Officer*    *Acting Commissioner of Patents and Trademarks*